US009468855B2

(12) United States Patent
Carlberg et al.

(10) Patent No.: US 9,468,855 B2
(45) Date of Patent: Oct. 18, 2016

(54) SYSTEMS AND METHODS FOR CREATING AND JOINING TOURNAMENTS IN A MULTI-TENANT DATABASE SYSTEM ENVIRONMENT

(75) Inventors: Reid Carlberg, Chicago, IL (US); Paul Kopacki, Cupertino, CA (US)

(73) Assignee: salesforce.com, inc., San Francisco, CA (US)

( * ) Notice: Subject to any disclaimer, the term of this patent is extended or adjusted under 35 U.S.C. 154(b) by 855 days.

(21) Appl. No.: 13/277,060

(22) Filed: Oct. 19, 2011

(65) Prior Publication Data

US 2013/0006402 A1    Jan. 3, 2013

Related U.S. Application Data

(60) Provisional application No. 61/503,193, filed on Jun. 30, 2011.

(51) Int. Cl.
*G06F 17/00* (2006.01)
*A63F 13/795* (2014.01)
*A63F 13/798* (2014.01)
*A63F 13/75* (2014.01)
*G06Q 10/10* (2012.01)
*G07F 17/32* (2006.01)

(52) U.S. Cl.
CPC ............ *A63F 13/795* (2014.09); *A63F 13/75* (2014.09); *A63F 13/798* (2014.09); *G06Q 10/10* (2013.01); *G07F 17/3276* (2013.01)

(58) Field of Classification Search
USPC ......................................................... 463/42
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |

(Continued)

*Primary Examiner* — Jason Yen
(74) *Attorney, Agent, or Firm* — Lorenz & Kopf LLP

(57) ABSTRACT

A system and method for creating and joining a tournament in multi-tenant database environment is provided. The system for creating a tournament, for example, includes a database configured to securely store tenant based data and a processor communicatively connected to the database. The processor may be configured to receive number of participants data, assignment of participant data and type of tournament data, receive tournament access information, create tournament data based upon the number of participants data, the assignment of participants data and the type of tournament data, and push the tournament data to a tournament application on a domain of one or more tenants of the multi-tenant database system based upon the tournament access information.

20 Claims, 11 Drawing Sheets

(56) References Cited

U.S. PATENT DOCUMENTS

| | | | |
|---|---|---|---|
| 6,324,568 B1 | 11/2001 | Diec et al. | |
| 6,324,693 B1 | 11/2001 | Brodersen et al. | |
| 6,336,137 B1 | 1/2002 | Lee et al. | |
| D454,139 S | 3/2002 | Feldcamp et al. | |
| 6,367,077 B1 | 4/2002 | Brodersen et al. | |
| 6,393,605 B1 | 5/2002 | Loomans | |
| 6,405,220 B1 | 6/2002 | Brodersen et al. | |
| 6,434,550 B1 | 8/2002 | Warner et al. | |
| 6,446,089 B1 | 9/2002 | Brodersen et al. | |
| 6,535,909 B1 | 3/2003 | Rust | |
| 6,549,908 B1 | 4/2003 | Loomans | |
| 6,553,563 B2 | 4/2003 | Ambrose et al. | |
| 6,560,461 B1 | 5/2003 | Fomukong et al. | |
| 6,574,635 B2 | 6/2003 | Stauber et al. | |
| 6,577,726 B1 | 6/2003 | Huang et al. | |
| 6,601,087 B1 | 7/2003 | Zhu et al. | |
| 6,604,117 B2 | 8/2003 | Lim et al. | |
| 6,604,128 B2 | 8/2003 | Diec | |
| 6,609,150 B2 | 8/2003 | Lee et al. | |
| 6,621,834 B1 | 9/2003 | Scherpbier et al. | |
| 6,654,032 B1 | 11/2003 | Zhu et al. | |
| 6,665,648 B2 | 12/2003 | Brodersen et al. | |
| 6,665,655 B1 | 12/2003 | Warner et al. | |
| 6,684,438 B2 | 2/2004 | Brodersen et al. | |
| 6,711,565 B1 | 3/2004 | Subramaniam et al. | |
| 6,724,399 B1 | 4/2004 | Katchour et al. | |
| 6,728,702 B1 | 4/2004 | Subramaniam et al. | |
| 6,728,960 B1 | 4/2004 | Loomans | |
| 6,732,095 B1 | 5/2004 | Warshavsky et al. | |
| 6,732,100 B1 | 5/2004 | Brodersen et al. | |
| 6,732,111 B2 | 5/2004 | Brodersen et al. | |
| 6,754,681 B2 | 6/2004 | Brodersen et al. | |
| 6,763,351 B1 | 7/2004 | Subramaniam et al. | |
| 6,763,501 B1 | 7/2004 | Zhu et al. | |
| 6,768,904 B2 | 7/2004 | Kim | |
| 6,782,383 B2 | 8/2004 | Subramaniam et al. | |
| 6,804,330 B1 | 10/2004 | Jones et al. | |
| 6,826,565 B2 | 11/2004 | Ritchie et al. | |
| 6,826,582 B1 | 11/2004 | Chatterjee et al. | |
| 6,826,745 B2 | 11/2004 | Coker | |
| 6,829,655 B1 | 12/2004 | Huang et al. | |
| 6,842,748 B1 | 1/2005 | Warner et al. | |
| 6,850,895 B2 | 2/2005 | Brodersen et al. | |
| 6,850,949 B2 | 2/2005 | Warner et al. | |
| 7,340,411 B2 | 3/2008 | Cook | |
| 7,620,655 B2 | 11/2009 | Larsson et al. | |
| 7,698,160 B2 | 4/2010 | Beaven et al. | |
| 8,082,301 B2 | 12/2011 | Ahlgren et al. | |
| 8,095,413 B1 | 1/2012 | Beaven | |
| 8,095,594 B2 | 1/2012 | Beaven et al. | |
| 8,275,836 B2 | 9/2012 | Beaven et al. | |
| 2001/0004609 A1* | 6/2001 | Walker et al. | 463/42 |
| 2001/0044791 A1 | 11/2001 | Richter et al. | |
| 2002/0072951 A1 | 6/2002 | Lee et al. | |
| 2002/0082892 A1 | 6/2002 | Raffel | |
| 2002/0129352 A1 | 9/2002 | Brodersen et al. | |
| 2002/0140731 A1 | 10/2002 | Subramaniam et al. | |
| 2002/0142842 A1* | 10/2002 | Easley et al. | 463/42 |
| 2002/0143997 A1 | 10/2002 | Huang et al. | |
| 2002/0155886 A1* | 10/2002 | Kidron | 463/25 |
| 2002/0162090 A1 | 10/2002 | Parnell et al. | |
| 2002/0165742 A1 | 11/2002 | Robbins | |
| 2003/0004971 A1 | 1/2003 | Gong | |
| 2003/0018705 A1 | 1/2003 | Chen et al. | |
| 2003/0018830 A1 | 1/2003 | Chen et al. | |
| 2003/0066031 A1 | 4/2003 | Laane et al. | |
| 2003/0066032 A1 | 4/2003 | Ramachandran et al. | |
| 2003/0069936 A1 | 4/2003 | Warner et al. | |
| 2003/0070000 A1 | 4/2003 | Coker et al. | |
| 2003/0070004 A1 | 4/2003 | Mukundan et al. | |
| 2003/0070005 A1 | 4/2003 | Mukundan et al. | |
| 2003/0074418 A1 | 4/2003 | Coker et al. | |
| 2003/0120675 A1 | 6/2003 | Stauber et al. | |
| 2003/0151633 A1 | 8/2003 | George et al. | |
| 2003/0159136 A1 | 8/2003 | Huang et al. | |
| 2003/0187921 A1 | 10/2003 | Diec et al. | |
| 2003/0189600 A1 | 10/2003 | Gune et al. | |
| 2003/0190960 A1* | 10/2003 | Jokipii et al. | 463/42 |
| 2003/0204427 A1 | 10/2003 | Gune et al. | |
| 2003/0206192 A1 | 11/2003 | Chen et al. | |
| 2003/0225730 A1 | 12/2003 | Warner et al. | |
| 2004/0001092 A1 | 1/2004 | Rothwein et al. | |
| 2004/0010489 A1 | 1/2004 | Rio et al. | |
| 2004/0015981 A1 | 1/2004 | Coker et al. | |
| 2004/0027388 A1 | 2/2004 | Berg et al. | |
| 2004/0128001 A1 | 7/2004 | Levin et al. | |
| 2004/0186860 A1 | 9/2004 | Lee et al. | |
| 2004/0193510 A1 | 9/2004 | Catahan et al. | |
| 2004/0199489 A1 | 10/2004 | Barnes-Leon et al. | |
| 2004/0199536 A1 | 10/2004 | Barnes Leon et al. | |
| 2004/0199543 A1 | 10/2004 | Braud et al. | |
| 2004/0249854 A1 | 12/2004 | Barnes-Leon et al. | |
| 2004/0260534 A1 | 12/2004 | Pak et al. | |
| 2004/0260659 A1 | 12/2004 | Chan et al. | |
| 2004/0268299 A1 | 12/2004 | Lei et al. | |
| 2005/0050555 A1 | 3/2005 | Exley et al. | |
| 2005/0091098 A1 | 4/2005 | Brodersen et al. | |
| 2005/0261043 A1* | 11/2005 | Slade | 463/1 |
| 2007/0117617 A1* | 5/2007 | Spanton et al. | 463/29 |
| 2007/0191102 A1* | 8/2007 | Coliz et al. | 463/42 |
| 2007/0218997 A1* | 9/2007 | Cho | 463/42 |
| 2009/0191929 A1* | 7/2009 | Nicora | 463/3 |
| 2010/0062840 A1* | 3/2010 | Herrmann | 463/25 |
| 2010/0130280 A1* | 5/2010 | Arezina et al. | 463/20 |
| 2011/0256913 A1* | 10/2011 | Ford | 463/6 |
| 2011/0300926 A1* | 12/2011 | Englman et al. | 463/25 |
| 2012/0172133 A1* | 7/2012 | Trexler et al. | 463/42 |

* cited by examiner

FIG. 8

Brackets

800

Log Out | User1

Play | View Leader Boards | My Tournaments

Global Leader Boards | Tenant1 Leader Boards

Tournament 1

| Team Name | Tenant | Rank |
|---|---|---|
| Entry45 | Tenant34 | 1 |
| Entry3 | Tenant12 | 2 |
| Entry12 | - | 3 |
| Entry16 | Tenant3 | 4 |
| Entry7 | Tenant1 | 5 |
| Entry47 | - | 6 |
| Entry89 | Tenant12 | 7 |
| Entry4 | Tenant2 | 8 |
| Entry102 | Tenant23 | 9 |

Comments

SYSTEMS AND METHODS FOR CREATING AND JOINING TOURNAMENTS IN A MULTI-TENANT DATABASE SYSTEM ENVIRONMENT

CROSS-REFERENCE TO RELATED APPLICATION(S)

This application claims the benefit of U.S. provisional patent application Ser. No. 61/503,193, filed Jun. 30, 2011, the entire content of which is incorporated by reference herein.

TECHNICAL FIELD

The following relates to computer interfaces, and more particularly relates to systems and methods for creating and joining tournaments in a multi-tenant database environment.

BACKGROUND

Modern software development is evolving away from the client-server model toward "cloud"-based processing systems that provide access to data and services via the Internet or other networks. In contrast to prior systems that hosted networked applications on dedicated server hardware, the cloud computing model allows applications to be provided over the network "as a service" supplied by an infrastructure provider. The infrastructure provider typically abstracts the underlying hardware and other resources used to deliver a customer-developed application so that the customer no longer needs to operate and support dedicated server hardware. The cloud computing model can often provide substantial cost savings to the customer over the life of the application because the customer no longer needs to provide dedicated network infrastructure, electrical and temperature controls, physical security and other logistics in support of dedicated server hardware.

Although multi-tenant platforms can provide substantial benefits, they can be relatively difficult to design and develop. The often competing demands of integration and isolation between tenants, for example, can lead to any number of challenges in design and implementation. For example, even though multiple tenants share a common server, each tenant may be able to provide data or services to its customers using the tenant's own separate, unique network domain. Furthermore, applications which are accessible by multiple tenants need to maintain data isolation between the multiple tenants.

DESCRIPTION OF THE DRAWING FIGURES

Exemplary embodiments will hereinafter be described in conjunction with the following drawing figures, wherein like numerals denote like elements, and FIG. 1 is a block diagram of an exemplary multi-tenant data processing system;

FIG. 8 illustrates a global leader board interface in accordance with an embodiment;

FIG. 10 illustrates interface for viewing the tournaments the user is currently entered in.

DETAILED DESCRIPTION

According to various exemplary embodiments, systems and methods are provided to allow a user to create and join a tournament in a multi-tenant database environment.

Figure 1:
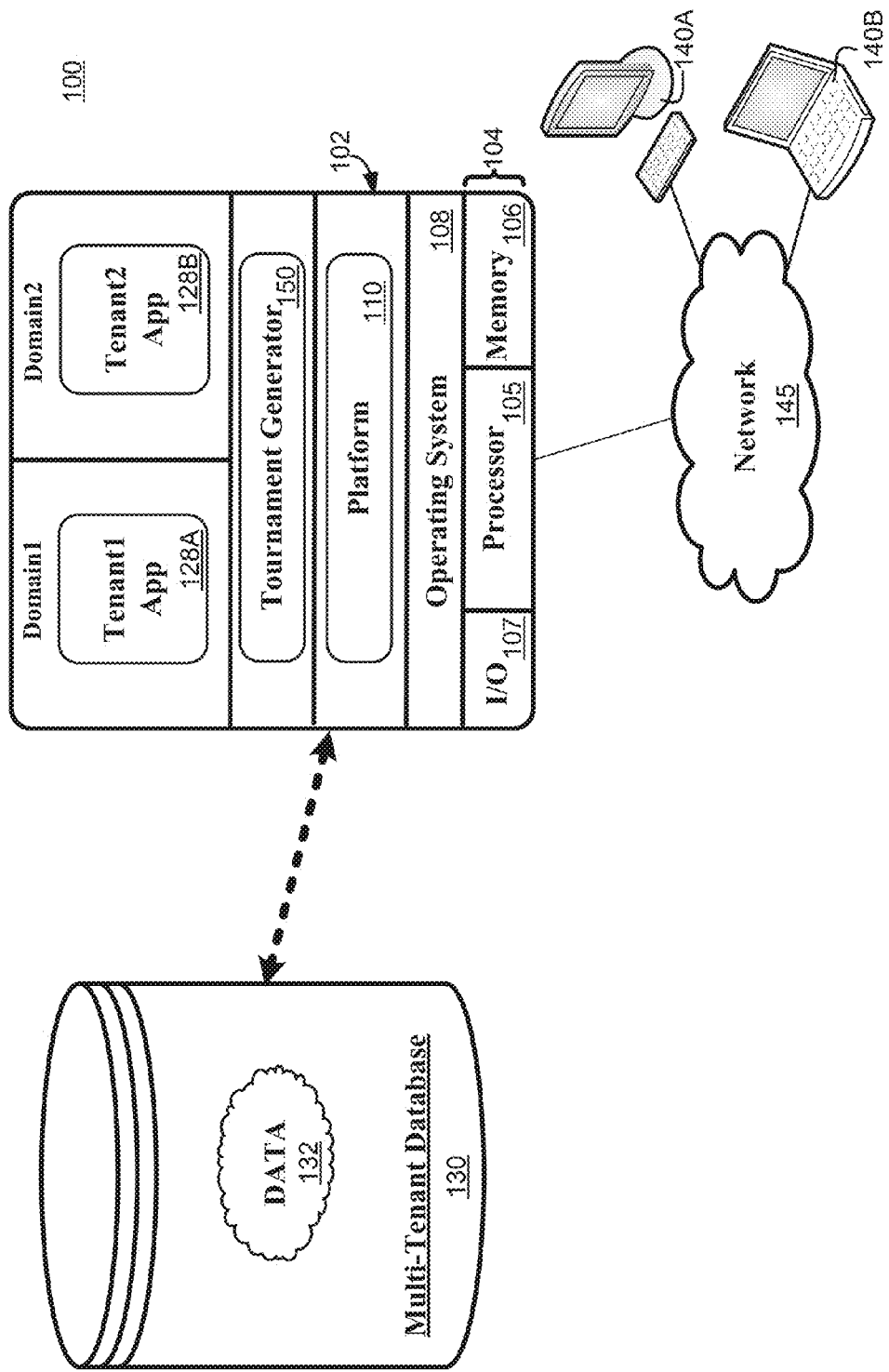

Turning now to FIG. 1, an exemplary multi-tenant application system 100 suitably includes a server 102 that dynamically creates virtual applications 128A-B based upon data 132 from a common database 130 that is shared between multiple tenants. Data and services generated by the virtual applications 128A-B are provided via network 145 to any number of client devices 140A-B, as desired. Each virtual application 128A-B is suitably generated at run-time using a common platform 110 that securely provides access to data 132 in database 130 for each of the various tenants subscribing to system 100. Each virtual application 128A-B may be accessible via a unique domain. For example, the virtual application 128A may be accessible on a first domain (e.g., http://www.companyname1.salesforce.com) and the application 128B may be accessible on a second domain (e.g., http://www.companyname2.com). The virtual applications 128A-B may be used, for example, by the various tenants to create and manage data or reports based upon data 132 in the common database 130. The server 102 also includes a tournament generating application 150 having a tournament interface which can be used to create and join tournaments, as discussed in further detail below.

A "tenant" generally refers to a group of users that shares access to common data within database 130. Tenants may represent customers, customer departments, business or legal organizations, and/or any other entities that maintain data for particular sets of users within system 100. Although multiple tenants may share access to a common server 102 and database 130, the particular data and services provided from server 102 to each tenant can be securely isolated from those provided to other tenants. The multi-tenant architecture allows different sets of users to share functionality without necessarily sharing each other's data 132.

Database 130 is any sort of repository or other data storage system capable of storing and managing data 132 associated with any number of tenants. Database 130 may be implemented using any type of conventional database server hardware. In various embodiments, database 130 shares processing hardware 104 with server 102. In other embodiments, database 130 is implemented using separate physical and/or virtual database server hardware that communicates with server 102 to perform the various functions described herein.

Server 102 is implemented using one or more actual and/or virtual computing systems that collectively provide a dynamic application platform 110 for generating virtual applications 128A-B. Server 102 operates with any sort of conventional computing hardware 104, such as any processor 105, memory 106, input/output features 107 and the like. Processor 105 may be implemented using one or more of microprocessors, microcontrollers, processing cores and/or other computing resources spread across any number of distributed or integrated systems, including any number of "cloud-based" or other virtual systems. Memory 106 represents any non-transitory short or long term storage capable of storing programming instructions for execution on processor 105, including any sort of random access memory (RAM), read only memory (ROM), flash memory, magnetic or optical mass storage, and/or the like. Input/output features 107 represent conventional interfaces to networks (e.g., to network 145, or any other local area, wide area or other network), mass storage, display devices, data entry devices and/or the like. In a typical embodiment, application platform 110 gains access to processing resources, communications interfaces and other features of hardware 104 using any sort of conventional or proprietary operating system 108. As noted above, server 102 may be implemented using a cluster of actual and/or virtual servers operating in conjunction with each other, typically in association with conventional network communications, cluster management, load balancing and other features as appropriate.

The tournament generator 150 interacts with a tournament application which can be downloaded to a user's domain and run as one of the virtual tenant applications 128A-B. Once a user downloads the tournament application to the user's domain, the user can launch the tournament application.

Tournaments are a fun way to compete with friends, engage employees and create healthy competition. An employer, for example, may want to create a tournament to see which salesman makes the most sales, which programmer finds the most bugs or which organization within the company is the most profitable. The employer may also want the employees to compete to see who can predict how the tournament will unfold. Others may want to setup an online tournament for a local little league, high school sports teams, or other amateur or professional sports to compete with friends or colleagues to see who can predict results.

Figure 2:
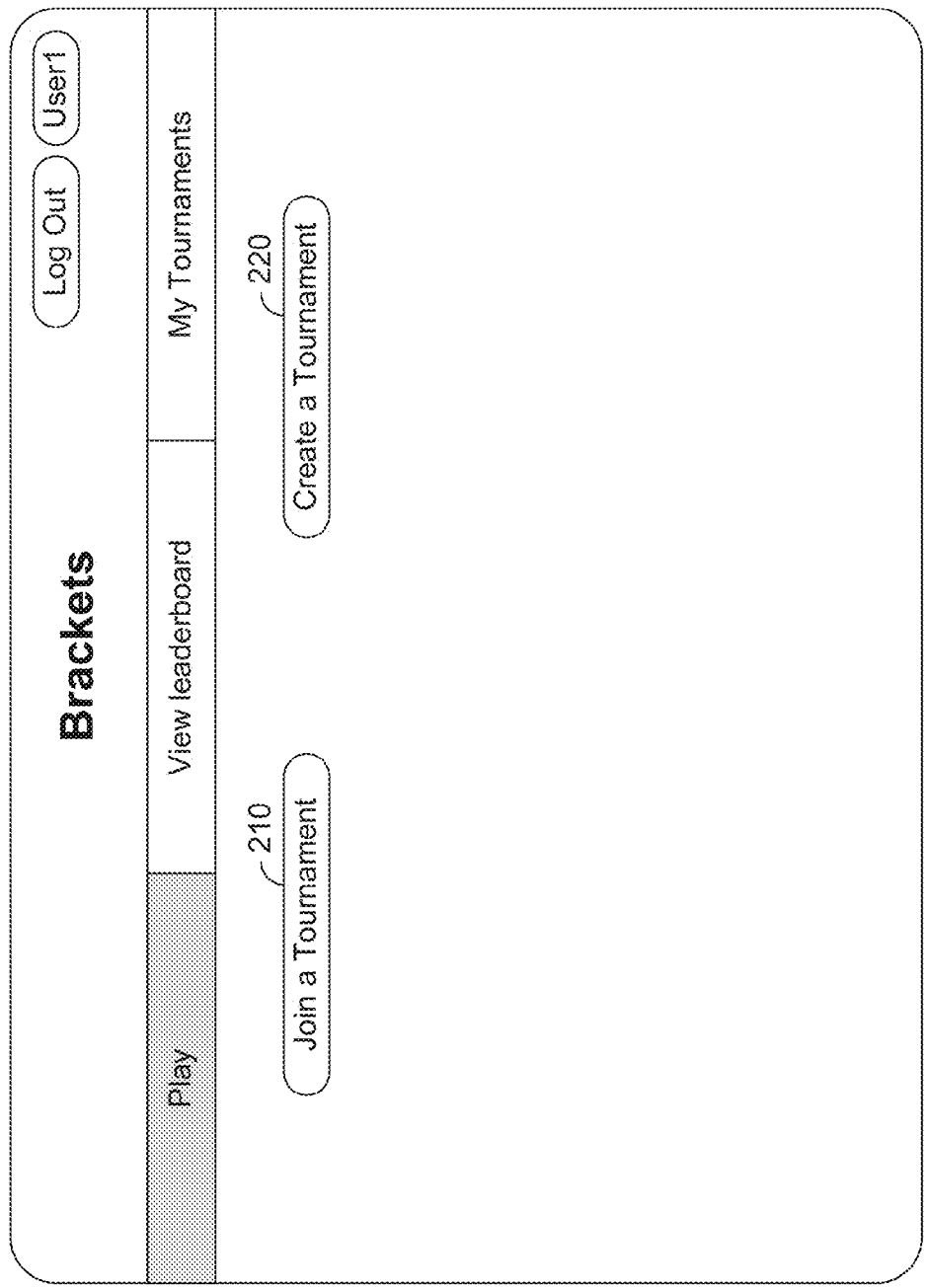
FIG. 2 illustrates an exemplary interface that allows a user to create or join a tournament in accordance with an embodiment.

FIG. 2 illustrates an exemplary tournament application interface 200 for the tournament application, in accordance with an embodiment. The interface 200 includes an interface control 210 that allows the user to join an existing tournament and an interface control 220 that allows a user to create a new tournament.

Figure 3:
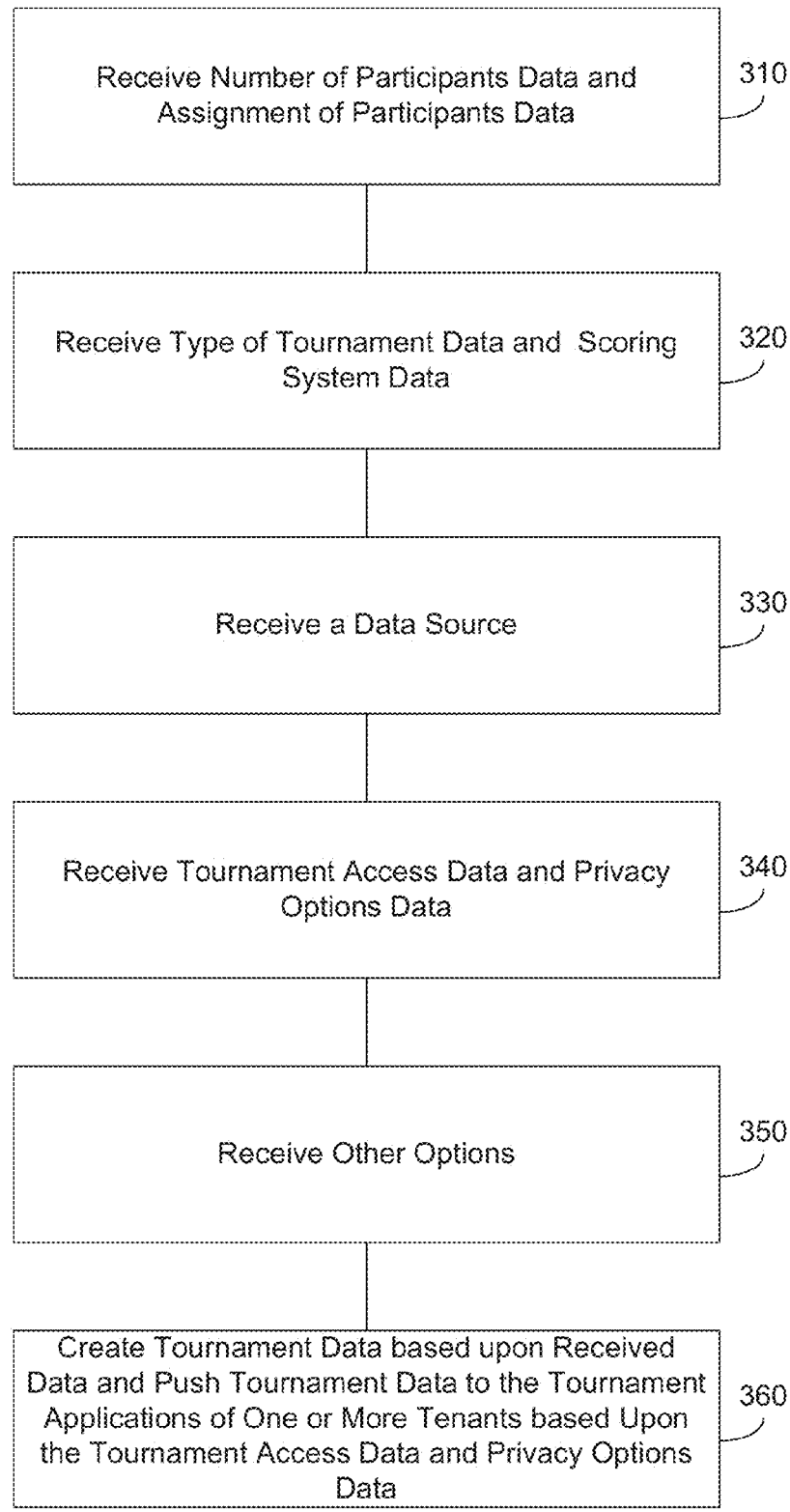
FIG. 3 is a flow chart illustrating an exemplary method for creating a tournament in accordance with an embodiment.

FIG. 3 illustrates an exemplary method 300 for creating a tournament in a multi-tenant database system, in accordance with an embodiment. In practice, the method 300 may be performed by a server such as the server 102 described above with reference to FIG. 1. The method includes receiving number of participants data and assignment of participants data. (Step 310). Participants, as used herein, are the individuals, groups or teams competing in the tournament. Users joining to play in the tournaments bet upon which of the participants will win respective matchups, as discussed in further detail below. As used herein, "number of participants data" is data indicating the number of participants in the tournament and "assignment of participants data" is data indicating the matchups between participants for at least one round of the tournament.

Figure 4:
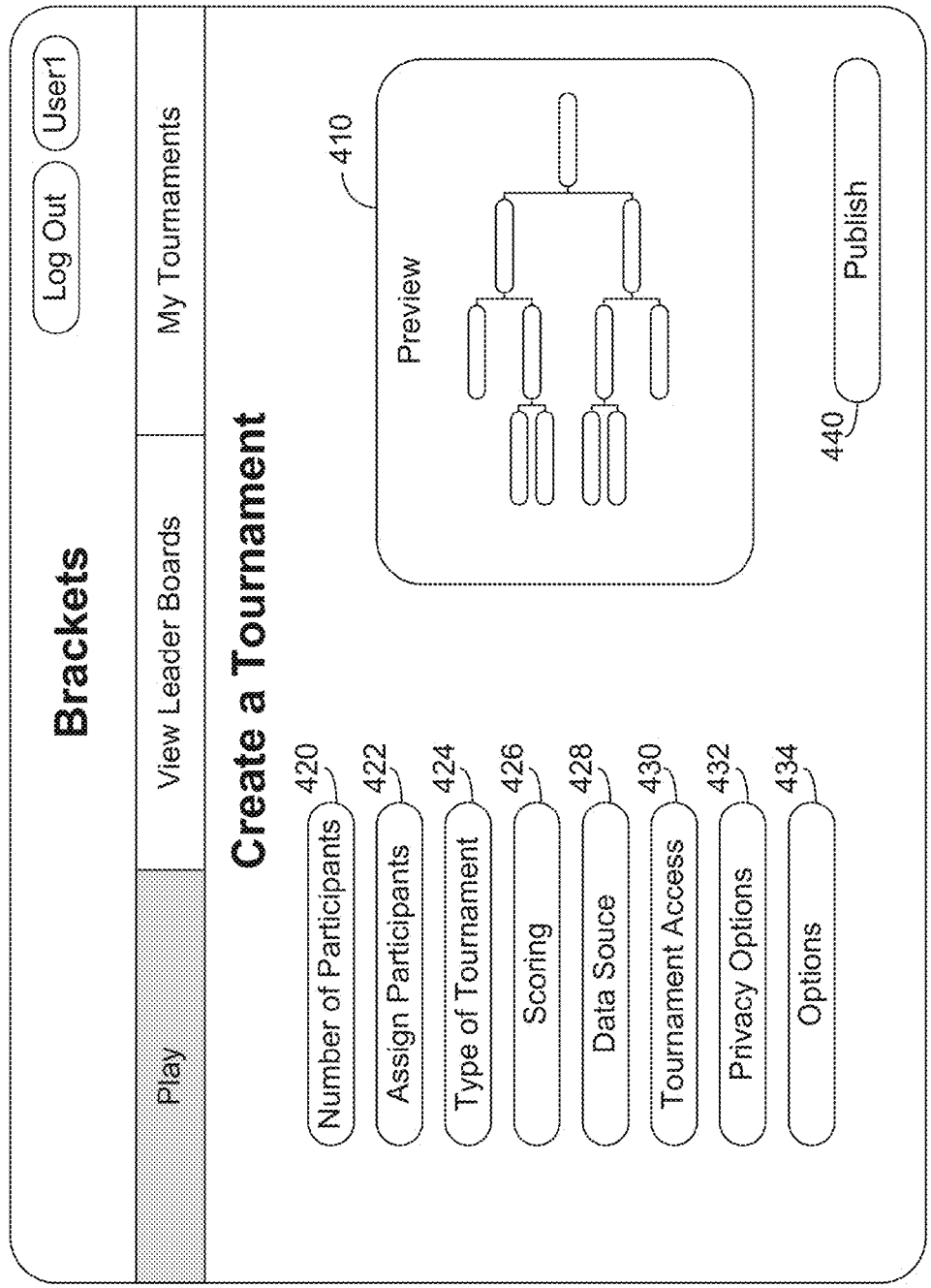
FIG. 4 illustrates an interface for creating a tournament in accordance with an embodiment.

FIG. 4 illustrates an exemplary tournament creation interface 400 which may be presented to the user upon interaction with the interface control 220 illustrated in FIG. 2, in accordance with an embodiment. The tournament creation interface 400 allows the user to create a tournament and to publish the tournament so that the tournament becomes available to other users within the user's own domain, or to other tenant domains, as discussed in further detail below. In one embodiment, for example, the tournament creation interface 400 includes a preview pane 410 which allows the user to visualize the tournament as the user selects the tournament settings.

The tournament creation interface 400 includes a number of secondary interfaces 420-434 which allow the user to customize certain aspects of the tournament. For example, the user can activate an interface control 420 to enter the number of participants (individuals, teams or any combination thereof) in the tournament. Any number participants may be used. The interface control 420 may also allow the user to customize format and matchups for the tournament. For example, the user may assign a bye-round to certain participants, so that the selected participant does not have an opponent for one or more rounds. Bye-rounds are useful when the number of participants doesn't allow for every participant to have an opponent each round.

The interface control 420 can be used, for example, to set up mini play-in tournaments. For example, if there are thirty-six participants in the tournament, twenty-eight of the participants may be assigned a bi-round for the first round, while the remaining eight participants face off in the first round to determine which participants will play in a traditional thirty-two participant tournament.

The interface control 420 may also be used to select a data source for the tournament which contains the number of participant data. For example, the user may select a data entry 132 in the multitenant database 130 where the number of participants for the tournament may be located. In one embodiment, for example, the data entry 132 may change until a tournament is locked, or closed to new participants. In this embodiment, the tournament generator 150 may automatically update the tournament to reflect the latest number of participants. In other embodiments, the tournament generator 150 may notify the user who created the tournament to manually update the tournament when new participants are added or removed.

The tournament creation interface 400 also includes an interface 422 to assign participants to the tournament. The assignments determine which participants are matched up against each other during the tournaments. In one embodiment, for example, the assignments may be based upon a ranking or order of the participants. By activating the interface 422, the user can manually set the matchups for the tournament in any arrangement. The interface 422, for example, may launch respective screens or GUI elements that in turn allow the user to create the assignment of participants data. In another embodiment, the user can use the interface 422 to select a data source which contains the participant assignments. For example, a data entry 132 in the multi-tenant database 130 may include the names of the participants. In one embodiment, for example, the data entry 132 which includes the names of the participants may be the same data entry which includes the number of participants. The user may also use the interface 422 to enter a description of each participant which other users may view when making their selections, as described in further detail below. The user could also user the interface 422 to enter description of each matchup, as discussed in further detail below.

Returning to FIG. 3, the method further includes receiving type of tournament data and scoring system data. (Step 320). The tournament creation interface 400 illustrated in FIG. 4 includes an exemplary interface 424 to choose the type of tournament. The interface 424 allows the user to choose from a variety of tournament styles. The interface generator 150 can be configured to implement any type of tournament.

Some exemplary tournaments that can be represented by the type of tournament data are single elimination, double elimination, round-robin, ladder and survivor tournaments. Tournament type interface 424 also allows the user to select between a full tournament and round-by-round selection requirements. By choosing the full tournament selection requirement, each user playing in the tournament must make all of their selections for the entire tournament before the tournament begins. In contrast, a round-by-round selection requirement requires the user to select the winning participants before each round begins.

The tournament creation interface 400 also includes a scoring system customization interface 426. The customization interface 426 allows the user to select the scoring system data from one of a number of standard scoring systems, or to make a customized scoring system. In some scoring systems a user may get a single point per correct prediction. In other scoring systems bonus points may be awarded for picking upsets, if there is a ranking associated with the participants. In some scoring systems the number of points awarded for making a correct prediction may increase based upon the current round. In other scoring systems a margin of victory, a total score, or any other statistic may be used to award points to users.

Returning to FIG. 3, the method further includes receiving a tournaments result data source. (Step 330). The tournament creation interface 400 illustrated in FIG. 4 also includes an exemplary interface control 428 for determining a tournaments result data source. The interface control 428 allows the user creating the tournament to select a data source for the tournament results. The data source may have a manual input option where the user will have to manually update the tournament results. In one embodiment, for example, the tournament generator 150 may send reminders to the tournament creator to update the tournament after a round was scheduled to occur. In other embodiments the user may select a data entry 132 in the database 130 as the source for tournament results. In this embodiment, the user may schedule a date and time for the tournament generator 150 to pull the results for each match and/or round of the tournament. In another embodiment, for example, the user may select a data source outside of the multi-tenant system 100 to pull the data from. For example, the user may select a data feed from a news agency or a database accessible through network 145 as the data source. The data source interface 428 may also allow the user to manage the data sources for the number of participants and the assignment of participants, as discussed above.

Returning to FIG. 3, the method further includes receiving tournament access data and privacy option data. (Step 340). As used here, "tournament access data" is data indicating which users may join the tournament and "privacy option data" is data indicating the privacy options for data related to the users. The tournament creation interface 400 includes an exemplary tournament access interface 430. The user may use the tournament access interface 430 to choose who may access the tournament. For example, the tournament may be selected to be a tournament global to the multi-tenant system 100. In this embodiment, for example, the tournament, upon creation, may be pushed by the tournament generator 150 to the virtual tournament application on each of the tenant's domains, allowing the users of the domain to join the tournament. The tournament may also be selected to be open to only users in the tournament creator's domain (i.e., the tenant of the user). Further, the tournament may be selected to be open to a subset of the tenants in the multi-tenant system 100. The tournament may also be selected to be private. When the tournament is private, the user creating the tournament selects a password which a user attempting to join the tournament must provide when joining the tournament. In this embodiment, the tournament access interface 432 may also provide the user creating the tournament an interface to message users with the password to join the tournament. The private tournament may be made accessible to users only within the same domain of the user creating the tournament (i.e., the tenant of the user) or the tournament may be made accessible to users in two or more tenants of the multi-tenant system 100. The user may also select whether the private tournament is visible or invisible to other users. If the tournament is visible, the tournament will show up on the list of available tournaments, however, a user will still have to provide the unique password to join the tournament. In contrast, an invisible tournament will not show up on the list of available tournaments. In one embodiment, for example, the user wishing to join the invisible tournament may use a separate interface to join the tournament, as discussed in greater detail below.

The tournament access interface 430 may also give the user the ability to make smaller open or private tournaments within a larger tournament. In one embodiment, for example, the user may create a tournament between groups of users within the tenant. The user creating the tournament can then create smaller tournaments for each group. In other embodiments, the user creating the tournament may enable other users to create local (i.e., local to each users domain) tournaments based upon a larger tournament, as discussed in further detail below.

The tournament creation interface 400 may also include a privacy options interface 434. As discussed above, the multi-tenant system 100 is designed to maintain data security between tenants, such that a user in one tenant can not access the data of users in another tenant while simultaneously sharing the system resources of the multi-tenant database system.

Returning to FIG. 3, the method further includes receiving option data. (Step 350). As used here, "option data" is data indicating other options for the tournament. The tournament creation interface 400 illustrated in FIG. 4 includes an exemplary option data interface 434. The option interface 434 may be used by the user to select other options for the tournament. For example, the user may select how many tournament entries users joining the tournament may enter.

Returning to FIG. 3, the method further includes creating tournament data based upon the received data and pushing the tournament data to tournament applications on one or more domains based upon the tournament access data and privacy option data. (Step 360). Once the user has finished customizing the tournament, the user can select a publish interface 440 to cause the tournament generator 150 to create the tournament data.

Any of the above discussed tournament creation interfaces 420-434 and the publishing interface 440 may be implemented in a variety of ways. For example, each interface may open to a separate window for the user select the respective options. Some of the interfaces may be menus, such as a drop down menu. Other options may be selected by checkboxes, radio buttons or the like. Any combination of the types of interfaces may be used.

Figure 5:
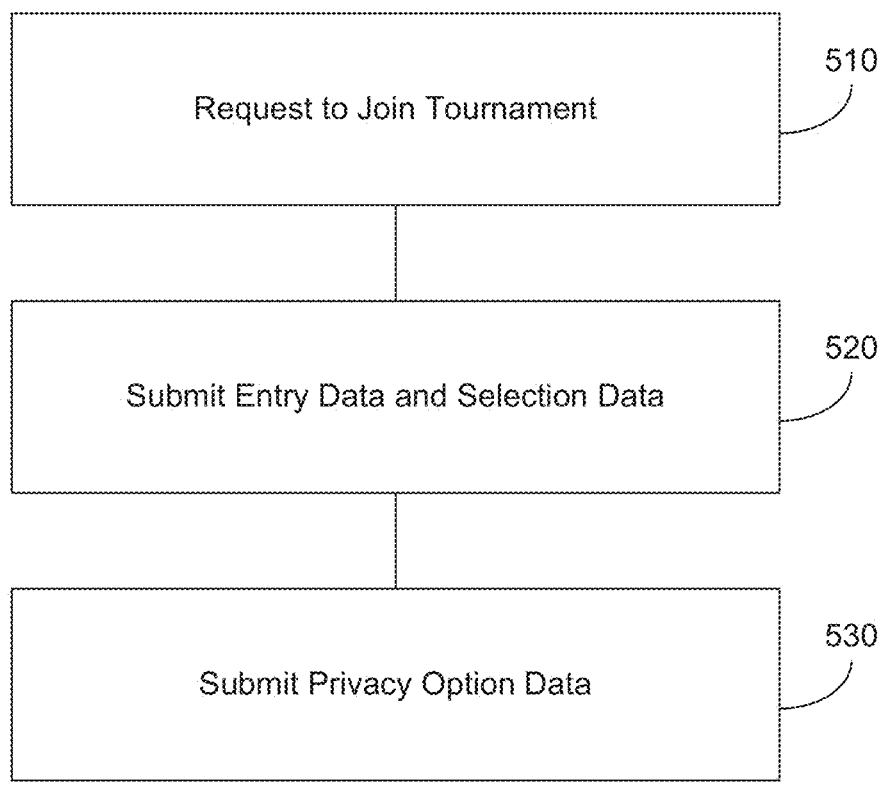
FIG. 5 is a flow chart illustrating an exemplary method for joining a tournament in accordance with an embodiment.
Figure 6:
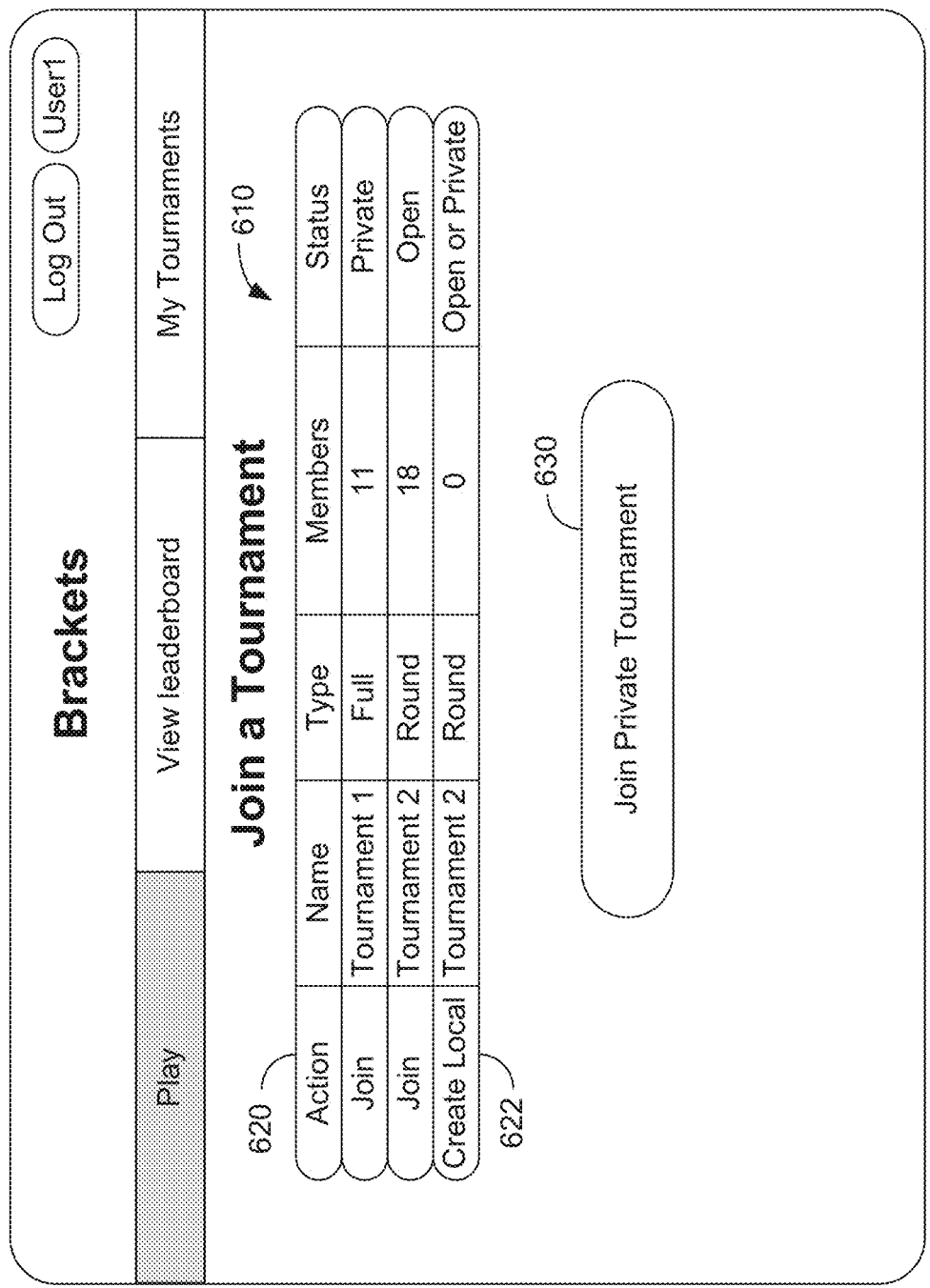
FIG. 6 illustrates an interface for joining a tournament in accordance with an embodiment.

FIG. 5 is a block diagram illustrating an exemplary method 500 for joining a tournament in a multi-tenant database system, in accordance with an embodiment. The user first begins by selecting a tournament to join. (Step 510). FIG. 6 illustrates an exemplary interface 600 which allows a user to join an existing tournament and which may be presented to the user upon interaction with interface 210 illustrated in FIG. 2, in accordance with an embodiment. The interface 600 includes a list 610 of the tournaments available to the user. As discussed above, when the tournament is created, the user creating the tournament determines the accessibility for each tournament. Only those tournaments accessible to the user and private tournaments selected to be visible will be included on the list 610. The list 610 includes an action interface 620 that allows the user to join a tournament. The interface 600 also includes an interface 630 to join a private tournament. As discussed above, some tournaments may be selected to be private and invisible. The interface 630 allows a user to enter the unique password to join a private tournament. In one embodiment, for example, the user attempting to join the private tournament may also have to enter the name of the private tournament. The name of the private tournament may be sent to the user along with the password by the user creating the tournament. Further, as discussed above, the user creating the tournament has the option of enabling other users to create local (local to a tenant) versions of the tournament. As seen in FIG. 6, the action interface 620 includes an interface 622 allowing the user to create a local version of Tournament 2. Upon interaction with the interface 622, the user can create a local tournament based upon the previously created tournament using the tournament creation interface illustrated in FIG. 4.

Figure 7:
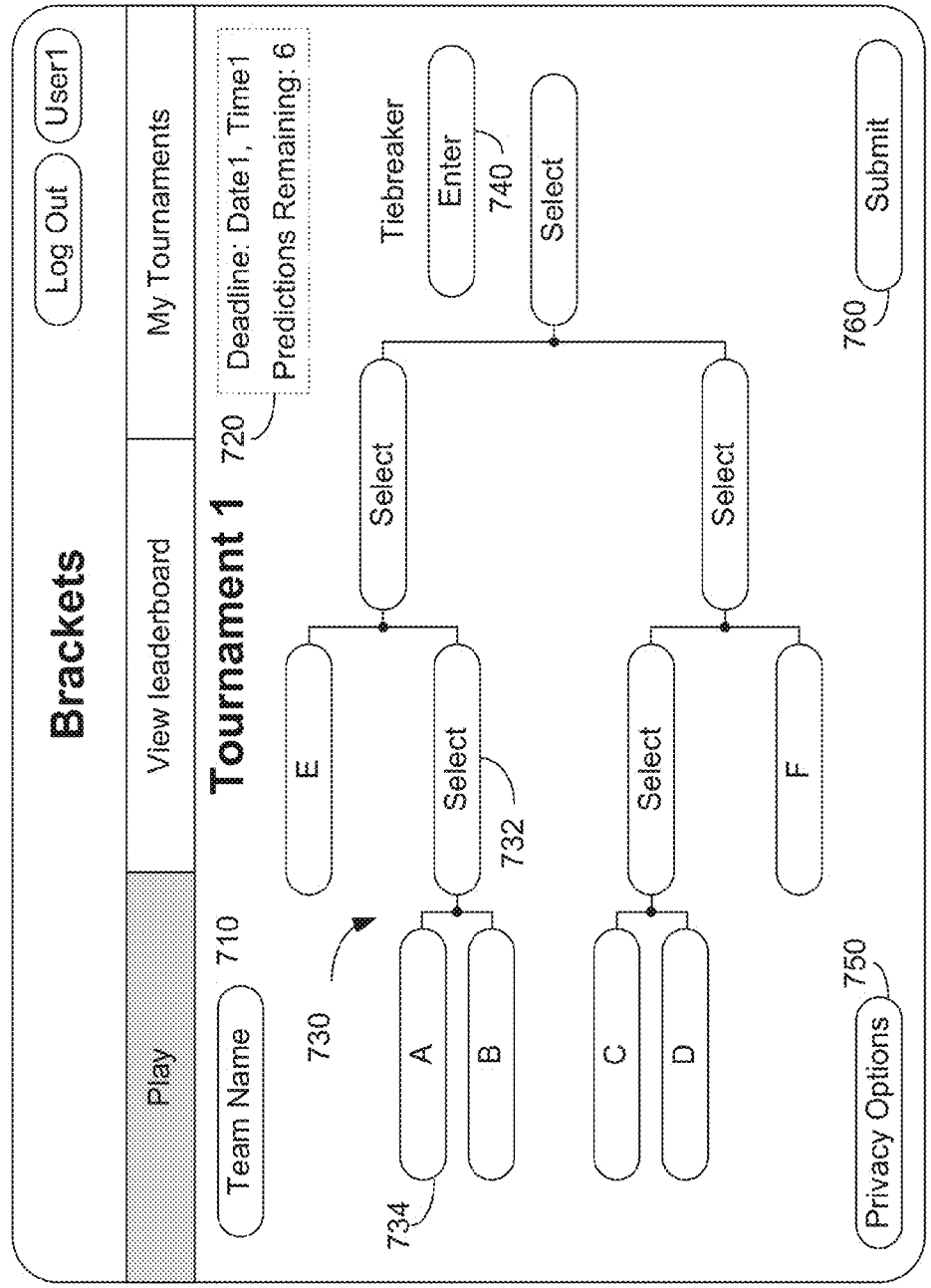
FIG. 7 illustrates an interface for selecting participants and customizing a user's tournament entry, in accordance with an embodiment.

Returning to FIG. 5, once the user has selected to join a tournament, the user customizes the entry by submitting entry data and participant selection data. (Step 520). FIG. 7 illustrates an exemplary interface 700 for selecting participants and customizing a user's tournament entry, in accordance with an embodiment. The interface 700 includes a team name interface 710, allowing the user to name their tournament entry. The interface 700 may also include an information interface 720. The information interface 720 presents information to the user about the tournament. In the embodiment illustrated in FIG. 7, for example, the information interface 720 includes a deadline for selecting participants and includes information regarding how many picks the user must make before the selection process is complete.

The interface 700 further includes a participant selection interface 730. In the embodiment illustrated in FIG. 7, the participant selection interface 730 includes a view of the tournament in a tree structure, displaying each matchup. In other embodiments, the participant selection interface 730 may display the tournament in, for example, a list form or in any other format. The participant selection interface 730 includes a selection area 732 for each selection to be made. In some embodiments, for example, the selection areas 732 could be, for example, drop down boxes or write in boxes. In other embodiments, the user may interact with a participant name interface 734 to select the participant for a corresponding matchup. For example, a user may click or double click on the corresponding name interface 734 to make a selection. The user may also interact with each name interface 734 to view information about a corresponding participant. In one embodiment, for example, a user could hover over each name interface 734 which would open a dialog box with information about the participant. In another embodiment, a user may click on the name interface 734 to open up a participant page to view information about a participant. Likewise, a user may interact with the selection area 732 to view information about a matchup between corresponding participants.

In one embodiment, for example, the interface 700 includes a tie break interface 740. The tie break interface 740 allows a user to enter a value corresponding to at least on of the matchups (e.g., the final matchup). The value will depend upon the measure being used to determine the winner for each matchup. In one embodiment, for example, if the tournament is based upon a sporting event, the value could be a total score between the two final teams, a score of the winning team, a score of the losing team, a margin of victory (difference between the winning team and the losing team, the number of touchdowns, goals, homeruns, strikeouts, free-throws made, or any other statistical measurement.

Once the user is satisfied with the selections, the user may interact with a submission interface 560 to submit the user's selections for the tournament.

Returning to FIG. 5, when the user selects to join a tournament the user may also select privacy options related to the user's entry. (Step 530). FIG. 7 also illustrates an exemplary privacy option interface 550. As discussed above, the user creating the tournament may select standard privacy options for the tournament, the privacy options determining what information is shared with other users. However, the privacy option interface 550 allows the user joining the tournament to tailor the privacy options to their liking. For example, the user may select to hide user identifying information which may otherwise be selected to be shared, for example, on a global leader board.

FIG. 8 illustrates an exemplary global leader board 800, in accordance with an embodiment. The global leader board 800 illustrated in FIG. 8 only illustrates a single leader board, however, multiple global leader boards may be presented. The global leader board 800 illustrated in FIG. 1, for example, is a global leader board for "Tournament 1," which is accessible by multiple tenants. As seen in FIG. 8, some of the users have selected to hide their tenant information.

Figure 9:
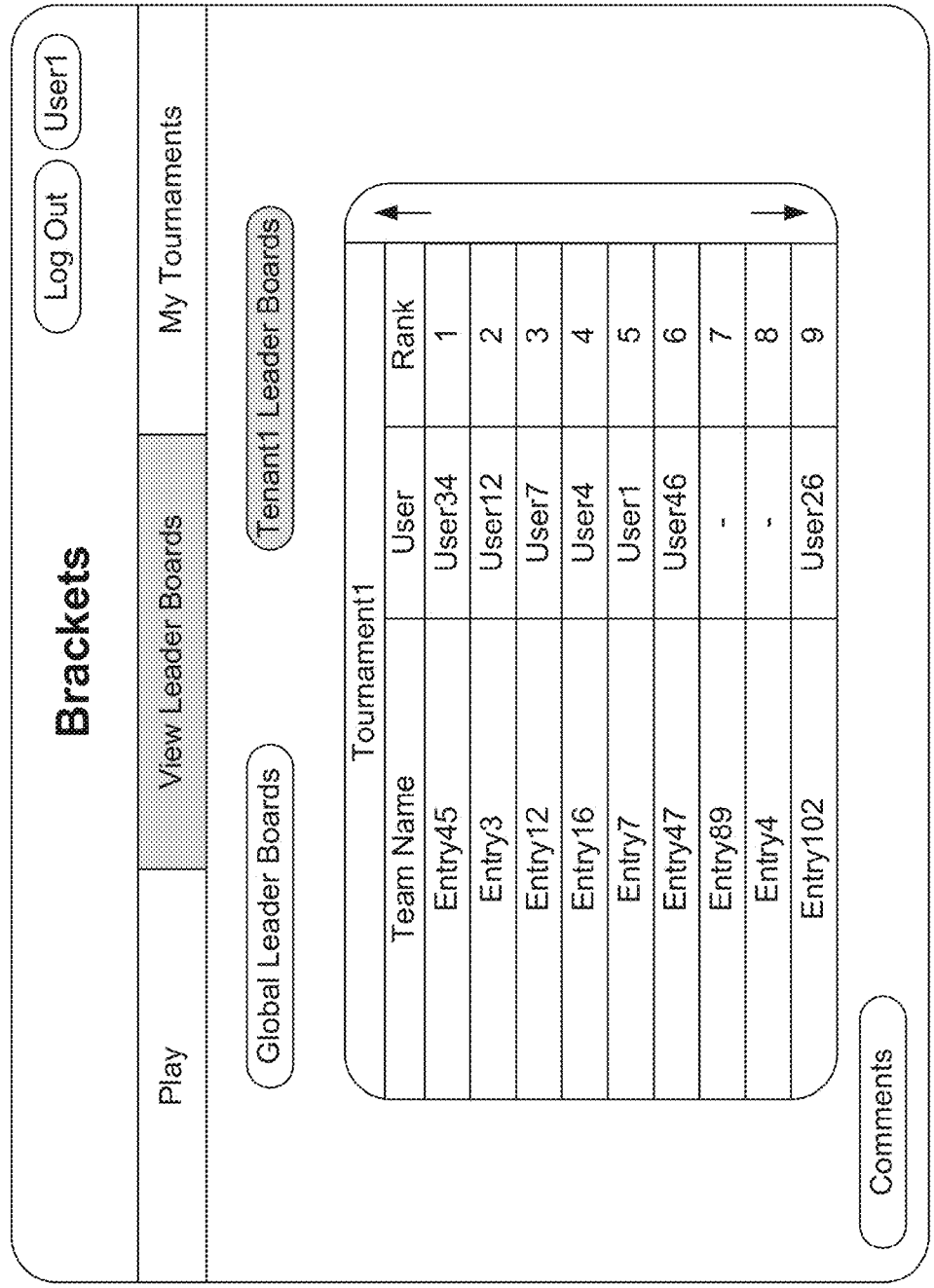
FIG. 9 illustrates a tenant leader board interface in accordance with an embodiment.

FIG. 9 illustrates an exemplary tenant leader board 900, in accordance with an embodiment. The tenant leader board 900 illustrated in FIG. 9 only illustrates a single leader board, however, multiple leader boards may be presented. The tenant leader board 900 illustrated in FIG. 1, for example, is a tenant leader board for "Tournament 1," which is accessible by only to the users in Tenant1. As seen in FIG. 9, some of the users have selected to hide their user information, which may identify the user.

Figure 10:
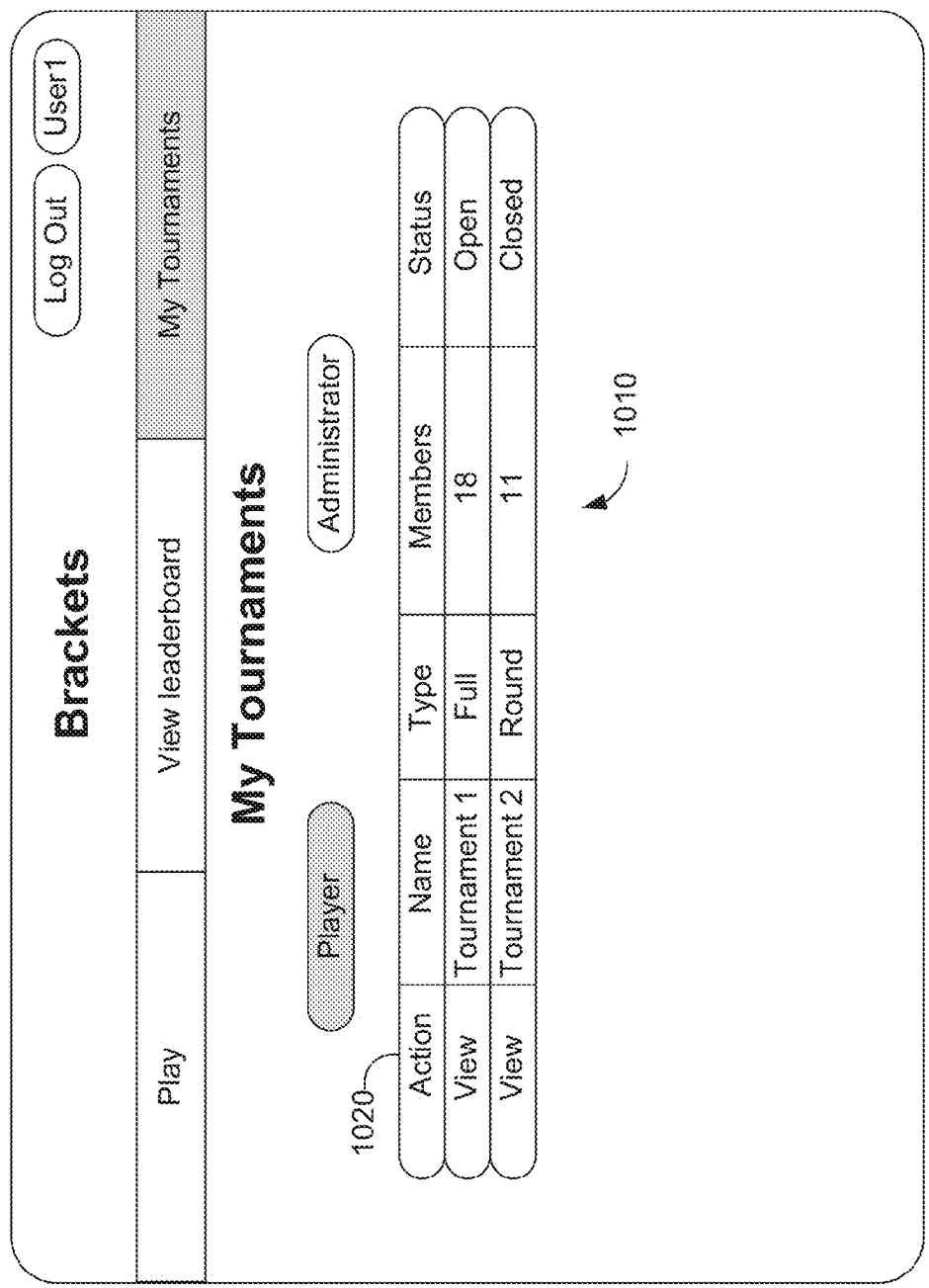
Figure 11:
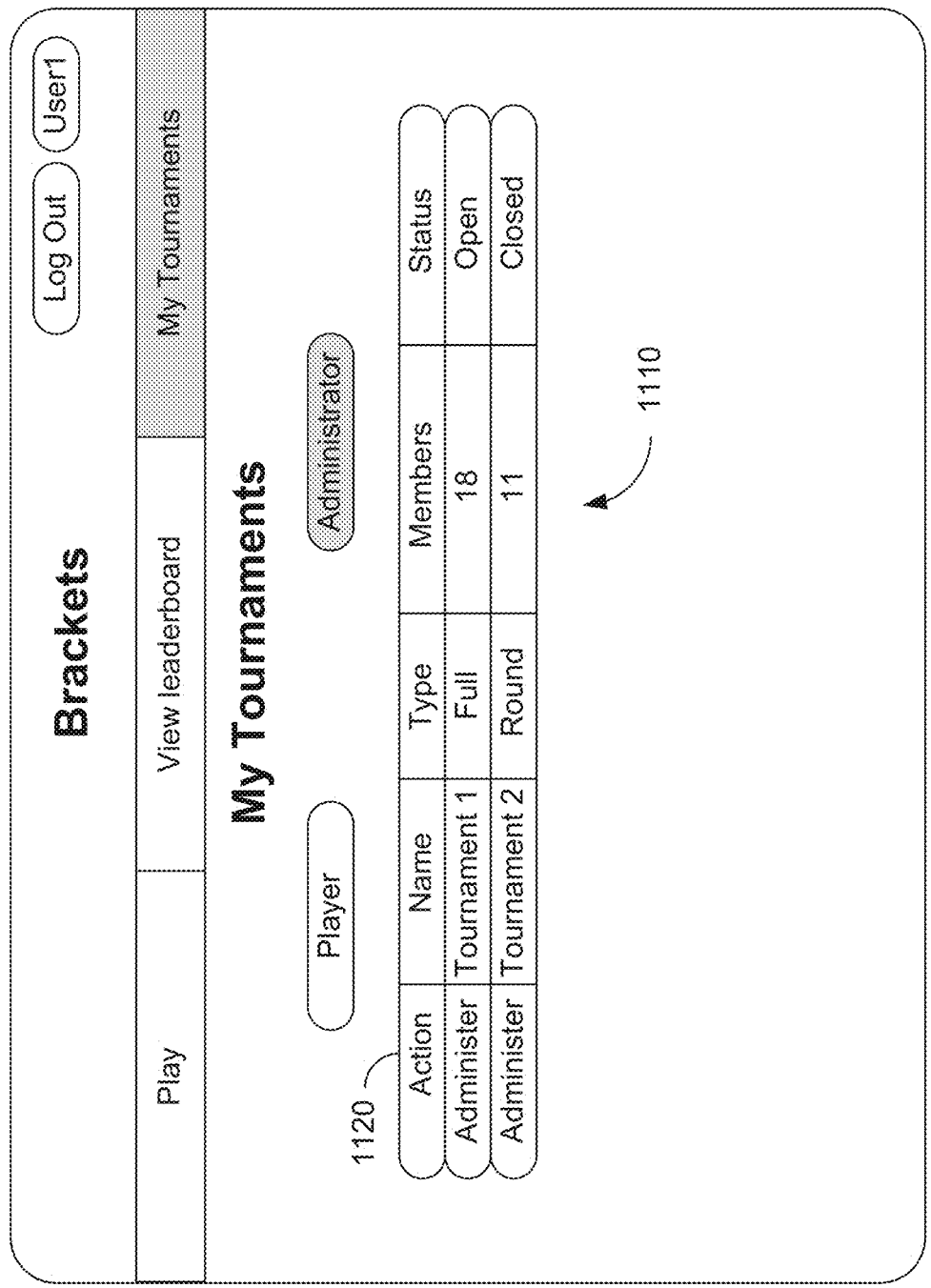
FIG. 11 illustrates exemplary interface for viewing the tournaments the user is currently administrating.

FIGS. 10 illustrates exemplary interface 1000 for viewing the tournaments the user is currently entered in. As seen in FIG. 10, the interface 1000 includes a list 1010 of tournaments the player has entered into. The list 1010 includes an action interface 1020 allowing a user to view their tournament entry. FIG. 11 illustrates exemplary interface 1100 for viewing the tournaments the user is currently administrating. As seen in FIG. 11, the interface 1100 includes a list 1110 of tournaments the user is administrating. The list includes an action interface 1020 allowing a user to modify the tournament.

Generally speaking, the various functions and features of method 300 and 500 may be carried out with any sort of hardware, software and/or firmware logic that is stored and/or executed on any platform. Some or all of method 300 and/or 500 may be carried out, for example, by logic executing within system 100 in FIG. 1. For example, various functions shown in FIG. 10 may be implemented using software or firmware logic that is stored in memory 106 and executed by processor 105 as part of application platform 110. The particular hardware, software and/or firmware logic that implements any of the various functions shown in FIGS. 3 and 5, however, may vary from context to context, implementation to implementation, and embodiment to embodiment in accordance with the various features, structures and environments set forth herein. The particular means used to implement each of the various functions shown in FIGS. 3 and 5, then, could be any sort of processing structures that are capable of executing software and/or firmware logic in any format, and/or any sort of application-specific or general purpose hardware, including any sort of discrete and/or integrated circuitry.

The term "exemplary" is used herein to represent one example, instance or illustration that may have any number of alternates. Any implementation described herein as "exemplary" should not necessarily be construed as preferred or advantageous over other implementations.

Although several exemplary embodiments have been presented in the foregoing description, it should be appreciated that a vast number of alternate but equivalent variations exist, and the examples presented herein are not intended to limit the scope, applicability, or configuration of the embodiments in any way. To the contrary, various changes may be made in the function and arrangement of the various features described herein without departing from the scope of the claims and their legal equivalents.

What is claimed is:

1. A system for creating a tournament in a multi-tenant database environment, comprising:
    a database configured to securely store tenant based data; and
    a processor communicatively connected to the database, the processor configured to:
        receive number of participants data, assignment of participant data and type of tournament data;
        receive tournament access information;
        create tournament data based upon the number of participants data, the assignment of participants data and the type of tournament data; and
        push the tournament data to a tournament application on a domain of one or more tenants of the multi-tenant database system based upon the tournament access information.

2. The system of claim 1, wherein the processor is further configured to:
    receive privacy option data; and
    push the tournament data to the tournament application on the domain of one or more tenants of the multi-tenant database system based upon the privacy option data.

3. The system of claim 2, wherein the processor is further configured to:
    receive scoring option data;
    generate leader board data based upon the scoring option data; and
    push the leader board data to at least one of the tenants in the multi-tenant database based upon the privacy options.

4. The system of claim 1, wherein blocked users of one or more tenants of the multi-tenant database are precluded from joining the tournament.

5. The system of claim 2, wherein the privacy options includes a data security data defining the tournament data that may be shared between tournament users from the same tenant and between tournament users from different tenants.

6. The system of claim 1, wherein any number of participants may be participating in the tournament.

7. The system of claim 1, wherein a user creating the tournament creates the assignment of participants data and the participants may be assigned in any arrangement.

8. The system of claim 1, wherein results of the tournament are based upon a database entry stored in the database.

9. The system of claim 1, wherein the processor is further configured to retrieve the tournament results from the database at a predetermined time.

10. A method for creating a tournament in a multi-tenant database system, comprising:
    receiving, by a processor, number of participants data, assignment of participant data, type of tournament data and tournament access data;
    creating, by the processor, tournament data based upon the number of participants data, the assignment of participants data and the type of tournament data; and
    pushing, by the processor, the tournament data to a tournament application on a domain of one or more tenants of the multi-tenant database system based upon the tournament access information.

11. The method of claim 10, further comprising:
    receiving, by the processor, privacy option data; and
    pushing, by the processor, the tournament data to one or more tenants of the multi-tenant database based upon the privacy option data.

12. The method of claim 11, further comprising:
    receiving, by the processor, scoring option data;
    generating, by the processor, leader board data based upon the scoring option data; and
    pushing the leader board data to at least one of the tenants in the multi-tenant database based upon the privacy options.

13. The method of claim 10, further comprising:
    determining which users are allowed to join the tournament; and
    pushing the tournament application to the domain of one or more tenants of the multi-tenant database system based upon which of the users of the respective tenant are allowed to join the tournament.

14. The method of claim 11, wherein the privacy options includes a data security data defining the tournament data that may be shared between tournament users from the same tenant and between tournament users from different tenants.

15. The method of claim 10, further comprising retrieving, by the processor, tournament results from a database in the multi-tenant database system at a predetermined time.

16. The method of claim 10, further comprising retrieving, by the processor, tournament results from an external network and pushing the tournament results to the tournament application on the domain of the one or more tenants of the multi-tenant database system.

17. The method of claim 10, further comprising retrieving, by the processor, tournament results from a user input and pushing the tournament results to the tournament application on the domain of the one or more tenants of the multi-tenant database system.

18. A system for joining a tournament in a multi-tenant database environment, comprising:
    a database configured to securely store tenant based data; and
    a processor communicatively connected to the database, the processor configured to:
        push tournament data to a tournament application to a domain of at least one tenant, based upon tournament accesses data stored in the database;
        receive a request to join the tournament from a user in the tenant;
        push assignment of team data to the tournament application on the domain of the at least one tenant; and
        receive participant selection data from the user.

19. The system of claim 18, wherein the processor is further configured to:

receive privacy options from the user joining the tournament; and push leader board data to a tournament application on a domain of one or more tenants of the multi-tenant database system based upon the received privacy options.

20. The system of claim 18, wherein the privacy options determine how much information about the user that is shared to other users in the same tenant and other users in different tenants.

* * * * *